UNITED STATES PATENT OFFICE.

FRITZ FUNCKE AND CARL JAGERSPACHER, OF BASEL, SWITZERLAND, ASSIGNORS TO SOCIETY OF CHEMICAL INDUSTRY IN BASLE, OF BASEL, SWITZERLAND.

LEUCOTRIARYLMETHANAZO DYESTUFFS AND A PROCESS OF MAKING SAME.

1,237,192.      Specification of Letters Patent.      Patented Aug. 14, 1917.

No Drawing.      Application filed January 5, 1917. Serial No. 140,688.

*To all whom it may concern:*

Be it known that we, FRITZ FUNCKE and CARL JAGERSPACHER, citizens of the Swiss Republic, and residents of Basel, Switzerland, have invented new and useful Leucotriarylmethanazo Dyestuffs and Processes of Making Same, of which the following is a full, clear, and exact specification.

We have found that valuable new leucotriarylmethan dyestuffs are obtained by diazotizing the amidoleucopatentblue, resulting, for instance from the nitration of leucopatentblue and the subsequent reduction of the obtained nitro derivative, and by combining the thus prepared diazo body with an azo dyestuff component, as for instance an amin, a phenol, a naphthol, an aminophenol, an aminonaphthol or their sulfo- or carboxyl derivatives, pyrazolone derivatives, etc.

The new dyestuffs dye on mordants and are therefore especially applicable for dyeing animal fiber vivid blue to green tints, fast to washing and light, according to the methods usually employed for the dyestuffs which dye on mordants or are able to be chromated on the fiber. They constitute blue to green and yellow powders, soluble in water, with blue to green and yellow colorations and in concentrated sulfuric acid with yellow to violet colorations.

The new process will be illustrated by the following examples:

Example 1: 57 parts of amidoleucopatentblue prepared for instance by nitrating leucopatentblue (dyestuff obtained by condensing metanitrobenzaldehyde with diethylanilin, reducing the resulting nitro body, diazotizing the thus obtained amido body, boiling the resulting diazo derivative and transforming the thus obtained oxy body into disulfonic acid) for instance with a mixture of nitric acid and sulfuric acid and reducing the resulting nitro derivative, are dissolved in about 250 parts water at 40° C. and 25 parts soda lye of 30%, to the solution thus obtained are added 7 parts sodium nitrite and the mass is acidulated at 0° C. by adding 40 parts concentrated hydrochloric acid. The obtained solution of the diazo derivative is poured into a solution as much concentrated as possible of 14 parts betanaphthol, 13 parts soda lye of 30% and 50 gr. sodium carbonate. After the mass has been stirred or allowed to stand for several days, the combination, which proceeds very slowly, is achieved and the dyestuff is salted out. It constitutes a blue powder dissolving in water with a blue and in concentrated sulfuric acid with a brown-violet coloration; it dyes wool in an acid bath green-blue tints, which by their treatment with chromium compounds become fast to washing and to light, while they turn to a blue fast to washing and to light by their treatment with copper compounds.

Example 2: 57 parts of amidoleucopatentblue are transformed into the diazo derivative as specified in Example 1 and the resulting solution of the diazo body is poured, while stirring, into a concentrated sodaalkaline solution of 17.5 parts 1-phenol-3-methyl-5-pyrazolone. After the combination is effected, the formed dyestuff is precipitated by addition of common salt. It constitutes a brown-yellow powder, dissolving in water with a yellow and in concentrated sulfuric acid with an orange-yellow coloration, and dyes wool in an acid bath green shades. By treating these dyeings with chromium compounds they turn to a blue-green fast to washing and to light and by treating the same dyeings with copper compounds or with iron salts pure green tints fast to washing and to light are obtained.

Example 3: The diazo derivative of 57 parts amidoleucopatentblue is introduced, while stirring, into a solution of 18 parts acetoacetanilid, 13 parts soda lye of 30% and 40 parts sodium carbonate in 300 parts water. After the mass has been allowed to stand for a long time, the dyestuff is salted out by addition of common salt and isolated in the usual manner. It dissolves in water to green-yellow and in concentrated sulfuric acid to orange-yellow solutions and dyes wool in an acid bath green tints turning, on treatment with chromium compounds, to a blue-green fast to washing and to light and, on treatment with copper compounds, to a very pure green fast to washing and to light.

What we claim is:

1. The described process for the manufacture of new leucotriarylmethanazo dyestuffs consisting in diazotizing amidoleucopatentblue and combining the thus obtained diazo body with an azo dyestuff component.

2. As new products, the herein described leucotriarylmethanazo dyestuffs derived from the diazo derivative of amidoleucopatentblue, constituting blue to green and yellow powders, soluble in water with blue to green and yellow colorations and in concentrated sulfuric acid with yellow to violet colorations and dyeing animal fibers, according to the methods usually employed for the dyestuffs dyeing on mordants, vivid blue to green tints fast to washing and to light.

3. As a new article of manufacture, the herein described dyestuff derived from the diazo derivative of amidoleucopatentblue and 1-phenyl-3-methyl-5-pyrazolone, constituting a brown-yellow powder, dissolving in water to yellow and in concentrated sulfuric acid to orange-yellow solutions and dyeing animal fibers, according to the methods usually employed for the dyestuffs dyeing on mordants, blue-green to green tints fast to washing and to light.

In witness whereof we have hereunto signed our names this 18th day of December 1916, in the presence of two subscribing witnesses.

DR. FRITZ FUNCKE.
DR. CARL JÄGERSPACHER.

Witnesses:
LYDIA UEBELS,
AMAND RITTER.